US008032846B1

(12) United States Patent
Balasubramanian et al.

(10) Patent No.: US 8,032,846 B1
(45) Date of Patent: Oct. 4, 2011

(54) EFFICIENT PROVISIONING OF RESOURCES IN PUBLIC INFRASTRUCTURE FOR ELECTRONIC DESIGN AUTOMATION (EDA) TASKS

(75) Inventors: Ramakrishnan Balasubramanian, Santa Clara, CA (US); Sriram Sitaraman, Sunnyvale, CA (US); Suman Chakravartula, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/016,712

(22) Filed: Jan. 28, 2011

Related U.S. Application Data

(60) Provisional application No. 61/319,224, filed on Mar. 30, 2010, provisional application No. 61/319,219, filed on Mar. 30, 2010, provisional application No. 61/319,216, filed on Mar. 30, 2010, provisional application No. 61/319,206, filed on Mar. 30, 2010, provisional application No. 61/389,094, filed on Oct. 1, 2010.

(51) Int. Cl.
*G06F 17/50* (2006.01)
(52) U.S. Cl. ........................ 716/100; 716/139
(58) Field of Classification Search .................. None
See application file for complete search history.

(56) References Cited

U.S. PATENT DOCUMENTS

| | | | |
|---|---|---|---|
| 5,983,277 A | 11/1999 | Heile et al. | |
| 5,999,911 A * | 12/1999 | Berg et al. | 705/7.26 |
| 6,578,174 B2 | 6/2003 | Zizzo | |
| 6,594,799 B1 | 7/2003 | Robertson et al. | |
| 6,634,008 B1 | 10/2003 | Dole | |
| 7,055,113 B2 * | 5/2006 | Broberg et al. | 716/102 |
| 7,353,467 B2 | 4/2008 | Robertson et al. | |
| 7,546,571 B2 | 6/2009 | Mankin et al. | |
| 7,568,006 B2 | 7/2009 | Wilson | |
| 2002/0107809 A1 * | 8/2002 | Biddle et al. | 705/59 |
| 2004/0024673 A1 * | 2/2004 | Huettl et al. | 705/36 |
| 2008/0221959 A1 * | 9/2008 | Ganapathy et al. | 705/8 |

OTHER PUBLICATIONS

Byun et al., "Estimating Resource Needs for Time-Constrained Workflows", Fourth IEEE Int'l Conference on eScience, 2008 IEEE Computer Society, pp. 31-38.*
Cao et al., "An Optimized Algorithm for Task Scheduling Based on Activity Based Costing in Cloud Computing", 2009 IEEE, pp. 1-3.*
Marshall et al., "Elastic Site: Using Clouds to Elastically Extend Site Resources", Proceedings of the 2010 10th IEEE/ACM Int'l Conference on Cluster, Cloud and Grid Computing, pp. 43-52.*
Nazir et al., "A Cost Efficient Framework for Managing Distributed Resources in a Cluster Environment", 2009 11th IEEE Int'l Conference on High Performance Computing and Communications, pp. 29-35.*

(Continued)

*Primary Examiner* — Leigh Garbowski
(74) *Attorney, Agent, or Firm* — Fenwick & West LLP

(57) ABSTRACT

Provisioning resources in public cloud infrastructure to perform at least part of electronic design automation (EDA) tasks on the public cloud infrastructure. Performance metrics of servers in the public cloud infrastructure and performance history of a user's past EDA tasks are maintained to estimate operation parameters such as runtime of a new EDA task. Based on the estimation, a user can provision appropriate types and amounts of resources in the public cloud infrastructure in a cost-efficient manner. Also, a plurality of EDA tasks are assigned to computing resources in a manner that minimizes the overall cost for performing the EDA tasks.

18 Claims, 7 Drawing Sheets

OTHER PUBLICATIONS

Sotomayor et al., "Resource Leasing and the Art of Suspending Virtual Machines", 2009 11$^{th}$ IEEE Int'l Conference on High Perfomance Computing and Communications, pp. 59-68.*

Colgan, J. et al., "Does IC Design Have a Future in the Clouds?" DAC 2010, 47th ACM/IEEE Design Automation Conference (DAC), ACM, Jun. 13-18, 2010, pp. 412-414.

Lin, X. et al., "Architecture of Web-EDA System Based on Cloud Computing and Application for Project Management of IC Design," International conference on Anti-Counterfeiting Security and Identification in Communication, IEEE, Jul. 18-20, 2010, pp. 150-153.

* cited by examiner

EFFICIENT PROVISIONING OF RESOURCES IN PUBLIC INFRASTRUCTURE FOR ELECTRONIC DESIGN AUTOMATION (EDA) TASKS

CROSS-REFERENCE TO RELATED APPLICATIONS

This application claims priority under 35 U.S.C. §119(e) to co-pending U.S. Provisional Patent Application No. 61/319,224 entitled "Method or Apparatus for Automated Partitioning and Distribution of EDA Application Workloads between Multiple Hybrid Public/Private Cloud Infrastructure to Increase Workflow Efficiency," filed on Mar. 30, 2010; co-pending U.S. Provisional Patent Application No. 61/319,219 entitled "Algorithm to Provision Compute Capacity on Public Clouds On-demand Based on Historic EDA Job Flow Characteristics to Reduce Cost of Infrastructure," filed on Mar. 30, 2010; co-pending U.S. Provisional Patent Application No. 61/319,216 entitled "Method and System to Implement Least Infrastructure Cost for Executing EDA Simulation Workloads on Public Clouds," filed on Mar. 30, 2010; co-pending U.S. Provisional Patent Application No. 61/319,206 entitled "A Method Or Apparatus For Providing Intelligent Session Licensing/Entitlement In A Large Scale Hybrid Public/Private Cloud Architecture For EDA Simulation Workloads," filed on Mar. 30, 2010; and co-pending U.S. Provisional Patent Application No. 61/389,094 entitled "Efficient Provisioning of Resources in Public Infrastructure for Electronic Design Automation (EDA) Tasks," filed on Oct. 1, 2010, which are incorporated by reference herein in their entirety.

BACKGROUND

1. Field

This disclosure relates generally to provisioning resources on public cloud infrastructure or hybrid cloud infrastructure to perform electronic design automation (EDA) tasks.

2. Description of the Related Art

An electronic design automation (EDA) refers to software tools or processes of designing integrated circuit (IC) devices with the aid of computing devices. An EDA process generally includes, for example, system design operations, logic design and functional verification, synthesis, netlist verification, design planning, physical implementation, analysis and extraction, physical verification, resolution enhancement, and mask data preparation. EDA tools dedicated to one or more of these tasks are commercially available from EDA tool developers such as Synopsys, Inc. of Mountain View, Calif. Generally, the EDA tool developers grant licenses to use the EDA tools in return for licensing fees. The licensing fees increase as the number and types of accessible EDA tools increase.

As more components are integrated into an IC device and more functions are accommodated in the IC device, some EDA task sets have come to require a large amount of computing and storage resources. Some EDA task sets may take days, weeks or even months to accomplish. To reduce such an extended runtime or meet other constraint conditions, EDA task sets may be divided into multiple smaller EDA tasks and then executed on multiple computing resources (e.g., servers) in parallel. Some EDA tasks may take longer to finish while other EDA tasks may finish in relatively short time. Also, accomplishment of an EDA task may be a prerequisite to performing another EDA task. Hence, a careful planning of the EDA tasks is needed to accomplish the EDA tasks within the constraint conditions.

If computer resources are under-provisioned, the EDA task set may not be finished within time. Hence, in many cases, redundant computing resources are provisioned to ensure that the EDA tasks are finished within time. However, over-provisioning computing resources increases the cost associated with the EDA tasks.

Generally, the EDA task sets are performed intermittently depending on the design cycle of the designer's IC devices. During times when a new IC device is not being developed, the developer's servers or server farms may remain idle. If the servers or server farms are under-provisioned, however, there may be insufficient resources when the designer is actively designing the IC devices. The large fluctuation in the computing demand as a result of the design or product cycle renders performing the EDA tasks entirely in private infrastructure inefficient.

SUMMARY

Embodiments relate to provisioning computing resources in a public computing infrastructure to perform electronic design automation (EDA) tasks where the computing resources are provisioned based on performance metrics of the computing resources. An EDA task set is divided into a plurality of EDA tasks at least part of which is performed on the public computing infrastructure. The performance metrics represent performance characteristics of the computing resources associated with executing the EDA tasks. The performance metrics allows estimation of operational parameters associated with the EDA tasks. Based on the estimation, appropriate types and number of computing resources may be provisioned, and thereby avoid over-provisioning or under-provisioning of computing resources for the EDA task sets.

In one embodiment, the performance metrics include a performance ratio and past or statistical performance information. The performance ratio represents performance characteristics of a computing resource in the public computing infrastructure relative to a reference computing device. The past or statistical performance information represents performance characteristics of the computing resource in past EDA tasks.

Embodiments also relate to distributing EDA tasks to a plurality of workers provisioned in the public computing infrastructure where an EDA task is assigned to an already provisioned worker or a new worker is provisioned in place of the already provisioned worker based on cost associated with leasing the workers. Whether the EDA task can be accomplished within the remaining lease time of the already provisioned worker is considered in determining the assignment of the EDA task.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE EMBODIMENTS

The Figures and the following description relate to preferred embodiments by way of illustration only. It should be noted that from the following discussion, alternative embodiments of the structures and methods disclosed herein will be readily recognized as viable alternatives that may be employed without departing from the principles of the disclosure.

Reference will now be made in detail to several embodiments, examples of which are illustrated in the accompanying Figures. It is noted that wherever practicable similar or like reference numbers may be used in the Figures and may indicate similar or like functionality. The Figures depict embodiments for purposes of illustration only. One skilled in the art will readily recognize from the following description that alternative embodiments of the structures and methods illustrated herein may be employed without departing from the principles described herein.

Embodiments relate to provisioning resources in public cloud infrastructure to perform at least part of electronic design automation (EDA) tasks on the public cloud infrastructure. Performance metrics of servers in the public cloud infrastructure and performance history of a user's past EDA tasks are maintained to estimate operation parameters (e.g., runtime) of a new EDA task. Based on the estimation, appropriate types and amounts of resources can be provisioned in the public cloud infrastructure in a cost-efficient manner. Also, a plurality of EDA tasks are assigned to computing resources in a manner that minimizes the overall cost for performing the EDA tasks.

An operation parameter described herein refers to any parameter of interest to a user relating to one or more EDA tasks. The operation parameter for the same EDA task may vary depending on the provisioned computing resources. The operation parameter may include, but is not limited to, the runtime of the EDA tasks and an overall cost for performing the EDA tasks.

A constraint condition described herein refers to an operation parameter that a user wants to restrict within a predetermined range. The constraint condition may include, but is not limited to, the maximum runtime of the EDA tasks and the maximum overall cost for performing the EDA tasks.

A performance metric described herein refers to any parameter indicative of the performance characteristics of a computing resource or a set of computing resource. The performance metric may be, for example, a performance ratio of the resources and past or statistical information on previous runs of tasks. The performance metric can be determined, for example, by running a sample load on the computing resource, inferred from the configuration of the computing resource (e.g., CPU type, RAM capacity, etc.) or based on previous performance characteristics for comparable tasks.

Architecture and Overall Function of Cloud Computing System

Figure 1:
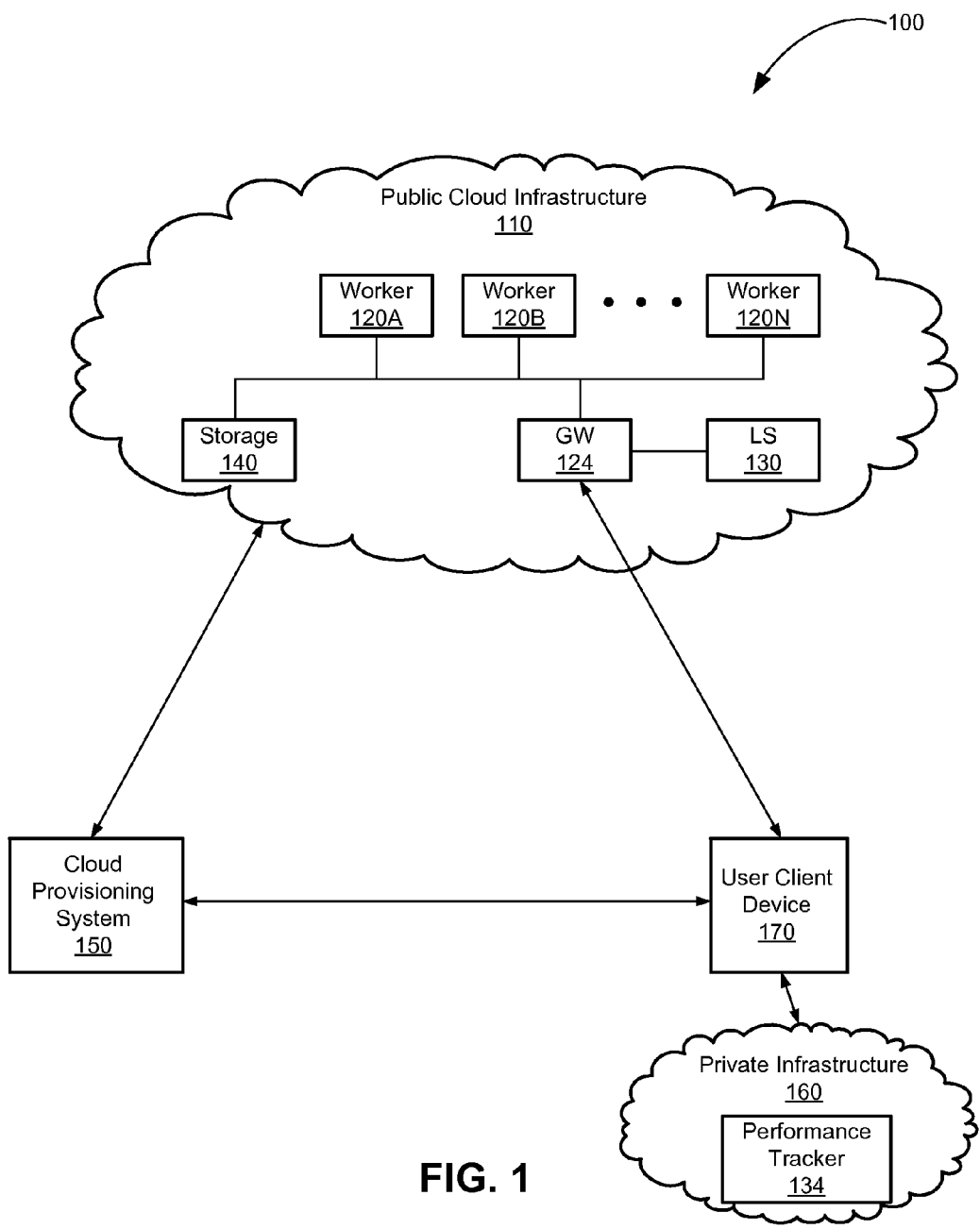
FIG. 1 is a diagram illustrating the architecture of a cloud computing system for performing electronic design automation (EDA) tasks, according to one embodiment.

FIG. 1 is a diagram illustrating the architecture of a cloud computing system 100 for performing electronic design automation (EDA) tasks, according to one embodiment. The cloud computing system 100 may include public cloud infrastructure 110, a cloud provisioning system 150, a user client device 170 and private infrastructure 160. In one embodiment, these components are located remotely from each other and communicate over channels established in a network (e.g., Internet). In other embodiments, some of the components of the cloud computing system 100 may be located on the same premise and communicate over a local area network (LAN). For example, the user client device 170 and the private infrastructure may be located on the same premise.

The public cloud infrastructure 110 includes, among others, computing resources and storage resources that may be provisioned for a user according to the user's demand. The public cloud infrastructure 110 may be managed by cloud vendors such as Amazon.com, Inc. (of Seattle, Wash.) and RackSpace US, Inc. (of San Antonio, Tex.). These vendors may charge customers for the metered use of computing resources based on the time period and types of the leased resources. In many cases, the vendors charge fees for the lease of resource on an hourly basis. The public cloud infrastructure 110 may include more than one type of servers with different performance profiles. Higher performance servers are likely to be charged at a higher price compared to lower performance counterparts. The resources in the public cloud infrastructure may be provisioned using an interface (not shown) provided by the vendors. The resources in the public cloud infrastructure 110 may be leased to multiple different users.

The cloud provisioning system 150 is hardware, software, firmware or a combination thereof for provisioning resources in the public cloud infrastructure 110 to perform EDA tasks, as described below in detail with reference to FIG. 3. The cloud provisioning system 150 provisions the resources for a user and allows the user to access the provisioned resources. The cloud provisioning system 150 stores information associated with servers capable for performing an EDA task, cost structure of using the public cloud infrastructure 110, and performance metrics of resources in the private infrastructure 160 and the public cloud infrastructure 110. The cloud provisioning system 150 develops a provisioning plan for deploying appropriate resources in a cost efficient manner in the public cloud infrastructure 110. In one embodiment, the cloud provisioning system 150 is operated by EDA tool developers such as Synopsys, Inc. of Mountain View, Calif. Operating of the cloud provisioning system 150 by the EDA tool developers is advantageous, among other reasons, because the EDA tool developers possess knowledge and information associated with optimally provisioning resources for their EDA tools.

The user client device 170 is hardware, software, firmware or a combination thereof for interfacing with the user to perform EDA tasks, as described below in detail with reference to FIG. 4. For this purpose, the user client device 170 communicates with the cloud provisioning system 150 and the provisioned resources in the public cloud infrastructure 110. The user client device 170 may also communicate with private infrastructure 160 to perform EDA tasks on the private infrastructure 160.

The private infrastructure 160 includes computing and storage resources that are privately operated by a user and are not accessible by other users. The private infrastructure 160 in conjunction with the public cloud infrastructure 110 forms hybrid cloud infrastructure. An EDA task set may be divided into multiple EDA tasks. Each EDA task can then be distributed to different resources in the public cloud infrastructure 110 and the private infrastructure 160 for fast and cost-efficient processing. The private infrastructure 160 may include a performance tracker 134 that evaluates the individual or collective performance characteristics of resources in the private infrastructure 160.

In an alternative embodiment, the cloud computing system 100 does not include the private infrastructure 160. In this embodiment, all EDA tasks are assigned to and performed on the public cloud infrastructure 110.

The overall process of an EDA operation on the cloud computing system 100 is described herein. First, the user client device 170 receives EDA tasks and determines if the private infrastructure 160 can perform the EDA tasks within given constraint conditions (e.g., maximum runtime). If it is determined that the private infrastructure 160 is insufficient to satisfy the constraint conditions, a user manually or by using a planning algorithm divides the EDA task set into multiple EDA tasks. Each EDA task is then assigned either to the public cloud infrastructure 110 or the private infrastructure 160. In one embodiment, the cloud provisioning system 150 reiteratively modifies the assignment of tasks until all constraint conditions are satisfied. In one embodiment, an optimization algorithm is used to identify optimal assignment of EDA tasks. The parameters associated with the optimizing algorithms include, but are not limited to, are CPU (Central Processing Unit) use time, memory usage, initial resources requested and task parameters (e.g., requested memory per task and total licenses requested).

After all EDA tasks are assigned to either the public cloud infrastructure 110 and the public infrastructure 160, the user client device 170 sends a provisioning request to the cloud provisioning system 150. The cloud provisioning system 150 then communicates with the public cloud infrastructure 110 to provision resources for performing the EDA tasks. After the resources are provisioned, the cloud provisioning system 150 hands over right to access the provisioned resources to the user client device 170. In one embodiment, the cloud provisioning system 150 replaces its credential with the user's public key to allow the user to access the provisioned resources.

The user client device 170 then uploads EDA information for selected tasks to the public cloud infrastructure 110. After the EDA information is uploaded to the public cloud infrastructure 110, the tasks are executed on the public cloud infrastructure 110. The EDA information refers to any information for performing the EDA task. The EDA information may include, for example, netlist or other information associated with designing an IC device.

While executing the EDA tasks, additional resources may be provisioned to increase the number of EDA tasks processed in parallel. Further, resources already provisioned may be decommissioned to minimize the cost. After all of the EDA tasks are terminated, the results of the tasks are collected at the user client device 170. Then the session on the public cloud infrastructure is terminated to avoid incurring further leasing costs.

Example of Provisioned Resources

FIG. 1 also illustrates an example of resources provisioned in the public cloud infrastructure 110. The provisioned resources may include, for example, a gateway server 124, a licensing server 130, a storage device 140, and workers 120A through 120N (hereinafter collectively referred to as the "workers 120"). During the provisioning process, the cloud provisioning system 150 provisions appropriate servers and loads these servers with corresponding software programs and EDA tools.

The gateway server 124 is hardware, software, firmware or a combination thereof for performing various operations including, but not limited to, (i) communicating with the user client device 170, (ii) monitoring the operation status of the workers 120, (iii) distributing EDA tasks to the workers 120, and (iv) requesting the provisioning of additional workers, if needed. The gateway server 124 is described below in detail with reference to FIG. 2.

The licensing server 130 authorizes check-out of licenses for operating EDA tools that are deployed and operated on the workers 120. The licensing server 130 may be a proxy of a central licensing server 130 maintained and operated by an EDA tool developer. The licensing server 130 imposes licensing restrictions such as the maximum number of EDA tools or the type of EDA tools that can be loaded onto the workers 120 at a time. The licenses are checked-in after an EDA task is terminated.

The storage device 140 stores information associated with the EDA tasks. Access to the storage device 140 is shared by the workers 120. The storage device 140 may store, among other information, source data for initiating the EDA tasks and intermediate data generated by operations performed at the workers 120.

The workers 120 are hardware, software, firmware or a combination thereof for performing EDA tasks. An EDA task set is divided into a smaller EDA tasks and assigned by the gateway server 124 to the workers 120 for parallel processing. The workers 120 are loaded with EDA tools and the user's EDA information (e.g., netlist) for performing the assigned EDA tasks. In one embodiment, each worker 120 has multiple slots where each slot can accommodate one EDA task. For example, each worker 120 has four slots to perform four EDA tasks in parallel. After initial provisioning of the workers 120, additional workers may be provisioned or decommissioned according to the workload.

Figure 2:
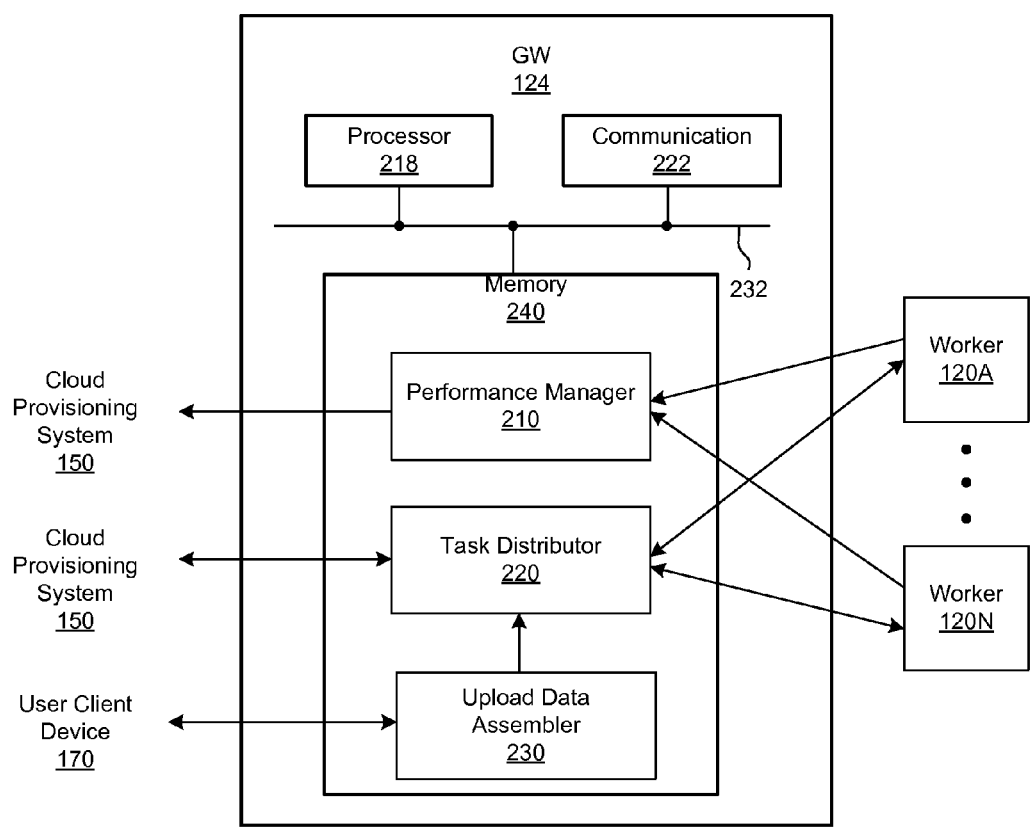
FIG. 2 is a block diagram of a gateway server, according to one embodiment.

FIG. 2 is a block diagram of the gateway server 124, according to one embodiment. The gateway server 124 may include, among other components, a processor 218, a communication module 222, memory 240 and a bus 232 for connecting these components. The processor 218 executes computer instructions stored in the memory 240. The communication module 222 is hardware, software, firmware or a combination thereof for communicating with other components of the cloud computing system 100. In one embodiment, the communication module 222 is embodied as a network card.

The memory 240 is a computer-readable storage medium for storing software modules. The memory 240 may include, among other modules, a performance manager 210, a task distributor 220 and an upload data assembler 230. Although these modules are illustrated in FIG. 2 as communicating directly with the workers 120, the cloud provisioning system 150 and the user client device 170, in practice, the software modules in the memory 240 communicates with the workers 120, the cloud provisioning system 150 and the user client device 170 via the communication module 222. Further, one or more software modules in the memory 240 may be installed and be executed on a server other than the gateway server 124.

The performance manager 210 monitors the performance characteristics of EDA tasks on the workers 120. The performance manager 210 then sends performance metrics of the workers 120 or a group of workers 120 to the cloud provisioning system 150. The performance metrics may include, for example, runtime of the EDA tasks, CPU and memory utilization of the server and the task and resource utilization patterns. In one embodiment, the cloud provisioning system 150 processes the received performance metrics and stores the processed information as past or statistical performance information associated with the resources of the public cloud infrastructure 110. A user is likely to perform similar EDA tasks repeatedly over time. Hence, the previous performance characteristics of the resources on similar EDA tasks are a good source of information for estimating the time or resources needed for performing an upcoming EDA tasks within the constraint conditions.

The task distributor 220 detects the workload and keeps track of remaining lease time of the workers 120. Based on the tracked workload status of the workers 120, the task distributor 220 assigns new EDA tasks to the workers 120. The process of distributing EDA tasks is described below in detail with reference to FIG. 9. The task distributor 220 may also communicate with the cloud provisioning system 150 to provision additional workers 120 or decommission unnecessary workers 120. The decommissioning may be performed by, for example, not extending the lease time of the worker.

The upload data assembler 230 communicates with the user client device 170 to receive and assemble the EDA information from the user client device 170. The uploaded EDA information may be distributed to relevant workers 120. The user client device 170 and the gateway server 124 may communicate over multiple channels. The upload data assembler 230 assembles segments of a file or multiple files communicated over the multiple channels for distribution. The assembled file or files may be stored in the storage device 140 for access by the workers 120.

Example Cloud Provisioning System

Unlike typical operations generally performed on a public cloud infrastructure such as webpage hosting, some EDA tasks require high performance servers while other EDA tasks can be performed on low performance servers. The EDA users may not have sufficient knowledge or information to provision appropriate resources for EDA tasks in a cost-effective manner. On the other hand, the EDA tool developers may possess knowledge and information for provisioning necessary resources in a cost efficient manner but EDA tool developers generally are not given access to the user's EDA tasks or EDA information. The EDA tool developers also do not have information about the performance characteristics of the private infrastructure of the user. Hence, the cloud provisioning system 150 receives and processes available description about the EDA tasks and information about the private infrastructure to provision appropriate types and number of resources in the public cloud infrastructure 110 sufficient to accomplish the EDA tasks within the constraint conditions while minimizing the overall cost associated with the provisioned resources.

Figure 3:
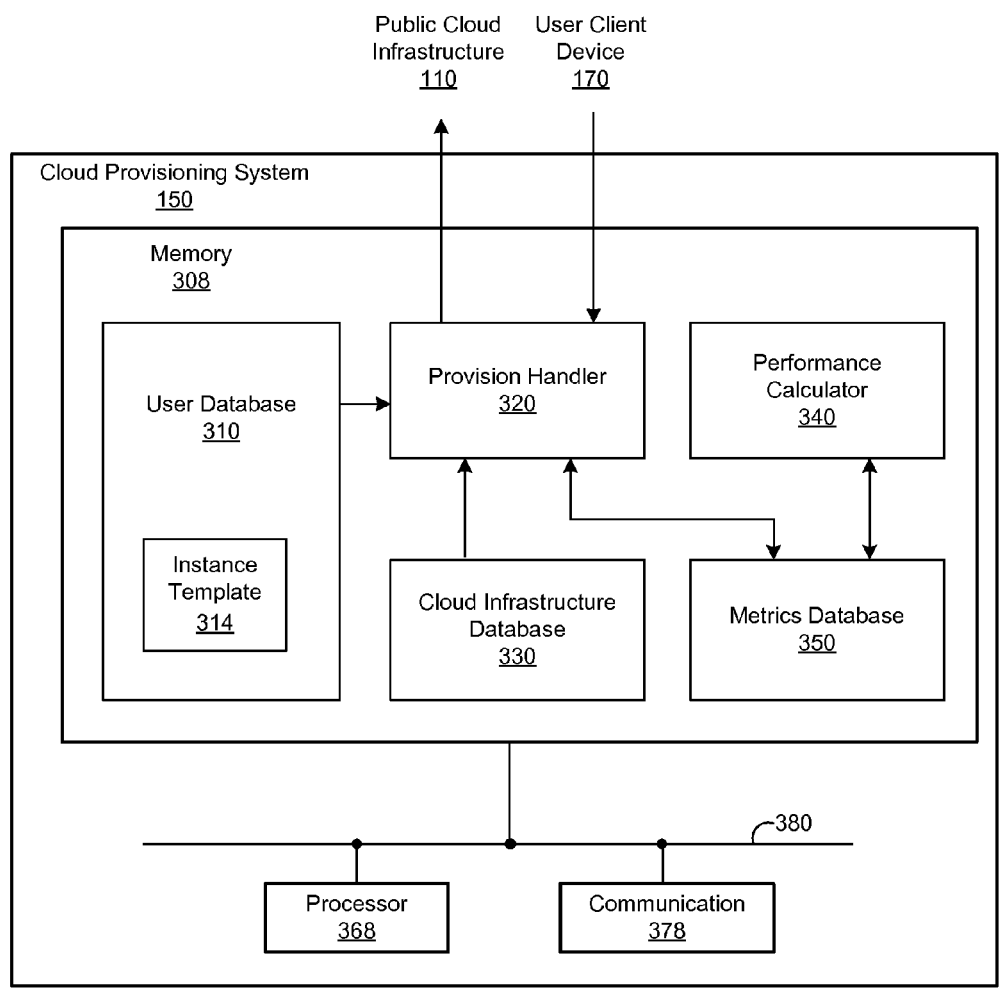
FIG. 3 is a block diagram of a cloud provisioning system, according to one embodiment.

FIG. 3 is a block diagram of the cloud provisioning system 150, according to one embodiment. The cloud provisioning system 150 may include, among other components, a processor 368, a communication module 378, memory 308 and a bus 380 connecting these components. The processor 368 executes instructions stored in the memory 308. The communication module 378 enables the cloud provisioning system 150 to communicate with other components of the cloud computing system 100 via a network. The cloud provisioning system 150 may also include other components not illustrated in FIG. 3 such as input modules or output modules.

The memory 308 may store, among other software modules, a user database 310, a provision handler 320, a cloud infrastructure database 330, a performance calculator 340 and a metrics database 350. The user database 310 stores data associated with users such as: (i) the user identity, (ii) authentication information (e.g., password), (iii) an instance template 314 and (iv) usage metrics showing patterns of resource usage.

The user identity in combination with the authentication information allows the users to log on to the cloud provisioning system 150. The instance template 314 describes a default configuration of resources to be provisioned at the public cloud infrastructure 110 for a user. The instance template 314 can describe, for example, the number of maximum workers, the identity of user's preferred public cloud vendor, master configuration of resources (e.g., the gateway server 124 and the licensing server 130), geographic zones associated with the user, and public keys of the users for accessing the public cloud infrastructure.

The default configuration of resources may be modified depending on the EDA tasks or other information (e.g., constraint conditions) received from the user client device 170.

The provision handler 320 determines the resources to be provisioned based on performance metrics of resources and the constraint conditions, as described below in detail with reference to FIG. 8.

The cloud infrastructure database 330 stores information associated with the public cloud infrastructure 110 including, but not limited to, costs associated with different types or categories of resources available for lease in the public cloud infrastructure 110 and credentials for accessing the public cloud infrastructure 110, and the performance ratio representing performance characteristics of a computing resource in the public computing infrastructure 110 relative to a computing resource in private infrastructure 160.

The metrics database 350 stores performance metrics associated with the performance characteristics of resources in the public cloud infrastructure 110 and the private infrastructure 160. The performance metrics of the private infrastructure 160 or its component resources may be received from the performance tracker 134 (refer to FIG. 1). The performance metrics of the public cloud infrastructure 110 or its component resources may be received from the gateway server 124 (refer to FIG. 1). The performance metrics can include performance information at one or more levels of granularity. The performance metrics may indicate, for example, (i) performance characteristics of a single server, (ii) performance characteristics of a subset of servers in public cloud infrastructure 110 or the private infrastructure 160, and (iii) performance characteristics of collective resources in the private infrastructure 160 or public cloud infrastructure 110. The metrics database 350 also stores history or statistical information of a user's previous EDA tasks performed on the private infrastructure 160 and/or the public cloud infrastructure 110.

The performance calculator 340 calculates a performance ratio between resources in the public cloud infrastructure 110 and the private infrastructure 160. The performance ratio represents the difference in the computing or processing performance characteristics of the resources in the public cloud infrastructure 110 and the private infrastructure 160. Since the performance characteristics of the public cloud infrastructure 110 vary depending on the provisioned resources, the performance calculator 450 may determine the performance ratio based on information about the provisioned resources. The performance ratio may also have one or more levels of granularity. The performance ratio may indicate the difference in the computing or processing capabilities of individual servers, a subset of servers or the provisioned servers as a whole. The performance ratio may be measured using several atomic parameters or by a linear combination or mapping of several parameters to each other. The performance ratio is also applicable to individual tasks, part of the tasks or to the entire set of tasks (i.e., workload).

In one embodiment, the performance ratio computed at the performance calculator 340 is stored in the metrics database 350. The provision handler 320 may access the performance ratio stored in the metrics database 350 to estimate the operation parameters when the EDA tasks are executed on the public cloud infrastructure 110 and the private infrastructure 160.

Also, the performance calculator 340 may convert performance metrics for comparison. If the performance metrics for resources in the private infrastructure 160 and the performance metrics for resources in the public cloud infrastructure 110 are expressed in different terms, the performance calculator 340 may convert the performance metrics to facilitate comparison and planning of EDA task allocation.

Example User Client Device

Figure 4:
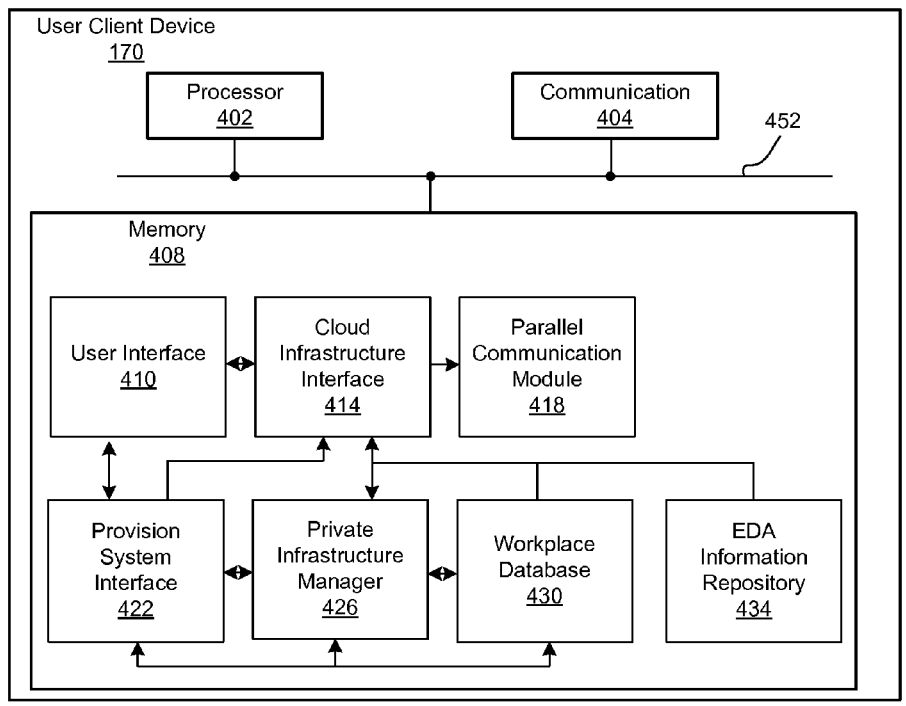
FIG. 4 is a block diagram of a user client device, according to one embodiment.

FIG. 4 is a block diagram of the user client device 170, according to one embodiment. The user client device 170 may include, among other components, a processor 402, a communication module 404, memory 408 and a bus 452 for connecting these components. The processor 402 executes instructions stored in the memory 408. The communication module 404 communicates with other components of the cloud computing system 100 via a network or a communication channel. The user client device 170 may include other components not illustrated in FIG. 4 such as an input device or a display device.

The memory 408 may store, for example, a user interface 410, a cloud infrastructure interface 414, a parallel communication module 418, a provision system interface 422, a private infrastructure manager 426, a workplace database 430 and an EDA information repository 434. The user interface 410 allows the user to provide inputs and view information associated with the EDA tasks. In one embodiment, the user interface 410 is an Internet browser.

The cloud infrastructure interface 414 enables the user client device 170 to communicate with the public cloud infrastructure 110. The cloud infrastructure interface 414 uses the user's credential to access the resources in the public cloud infrastructure 110, initiates a session with the cloud infrastructure interface 414 to upload the EDA information from the EDA information repository 434 to the workers 120 in the public cloud interface 110.

The parallel communication module 418 sends EDA information in the form of segmented data packets to the public cloud infrastructure 110 using multiple channels between the public cloud infrastructure 110 and the user client device 170. The parallel communication module 418 plans and coordinates communication of the EDA information with the gateway server 124.

The provision system interface 422 communicates with the cloud provisioning system 150 to send provision requests and receive information for accessing the provisioned resources. The provision system interface 422 may also send performance metrics of the private infrastructure 160 to the cloud provisioning system 150.

The private infrastructure manager 426 communicates with the private infrastructure 160 to perform various operations (e.g., EDA tasks) on the private infrastructure 160. The private infrastructure manager 426 may also collect performance metrics of the private infrastructure manager 426 after an EDA task is terminated. The performance metrics is sent to the cloud provisioning system 150 via the provision system interface 422 to update past or statistical performance information related to performance characteristics of the private infrastructure 160.

The workplace database 430 stores assignment of each EDA task to the public cloud infrastructure 110 or the private infrastructure 160. Based on assignment information of the workplace database 430, the private infrastructure manager 426 and the cloud infrastructure interface 414 upload the corresponding EDA information to the private infrastructure 160 or the public cloud infrastructure 110, respectively.

The EDA information repository 434 stores EDA information for performing the EDA tasks. The EDA information may include, for example, the netlist of a circuit design and various design parameters associated with verification processes. The private infrastructure manager 426 and the cloud infrastructure interface 414 selectively loads the EDA information to the private infrastructure manager 426 or the cloud infrastructure interface 414 as defined in the workplace database 430.

Example Method of Provisioning Resources

Figure 5:
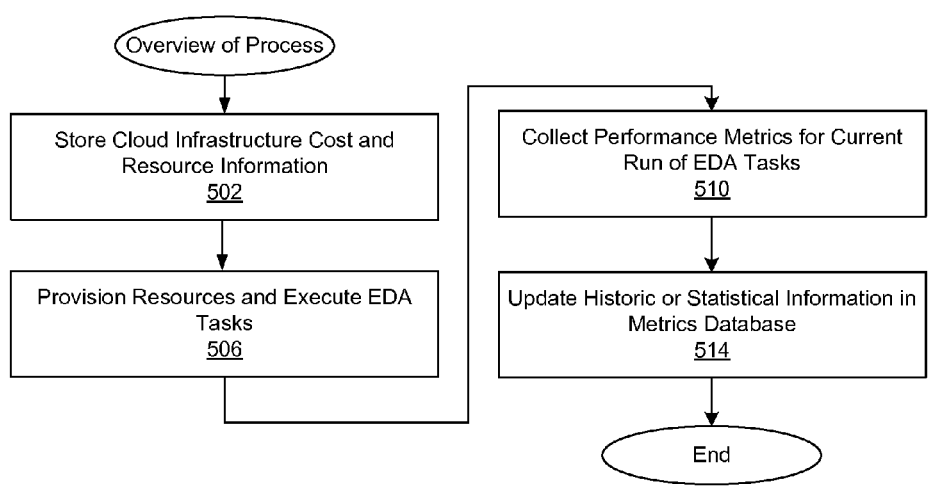
FIG. 5 is a flowchart illustrating an overall process of provisioning resources on public cloud infrastructure, according to one embodiment.

FIG. 5 is a flowchart illustrating an overall process of provisioning resources in the public cloud infrastructure 110, according to one embodiment. The costs associated with using resources in the cloud infrastructure, and information associated with the resources in the public cloud infrastructure 110 and the private infrastructure 160 are stored 502 in the metrics database 350 (refer to FIG. 3). The resource information includes, among others, the performance ratio of the resources and past or statistical information on previous runs of EDA tasks on the public cloud infrastructure 110 and the private infrastructure 160. The process of evaluating the performance characteristics of resources is described below in detail with reference to FIG. 6. In one embodiment, a performance characteristic model is derived from the resource information. The performance characteristic model enables estimation or prediction of operating parameters for various configuration of hybrid infrastructure.

The cloud provisioning system 150 provisions 506 the resources in the public cloud infrastructure 110 and executes 506 the EDA tasks on the public cloud infrastructure 110 and the private infrastructure 160. The process of provisioning the resources in the public cloud infrastructure 110 is described below in detail with reference to FIG. 7.

After the EDA tasks are terminated, the provision handler 320 of the provision handler 320 collects 510 performance metrics for the finished EDA tasks. Then the past or statistical performance information associated with the current user is updated 514 in the metrics database 350.

Figure 6:
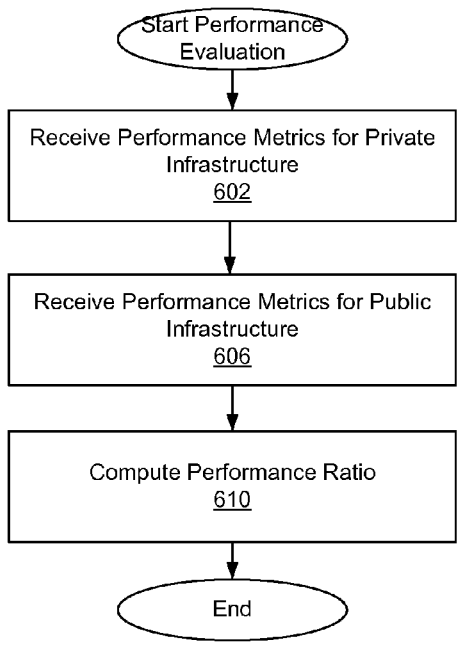
FIG. 6 is a flowchart illustrating a process of evaluating performance characteristics of private infrastructure and public cloud infrastructure, according to one embodiment.

FIG. 6 is a flowchart illustrating the process of evaluating performance characteristics of the private infrastructure 160 and the public cloud infrastructure 110, according to one embodiment. The performance tracker 134 deployed in the private infrastructure 160 runs a benchmark test to determine the performance characteristics of the resources in the private infrastructure 160. The performance metrics are obtained as a result of the benchmark test and are then sent to the cloud provisioning system 150 via the user client device 170. The cloud provisioning system 150 receives 602 the performance metrics from the user client device 170 and stores the performance metrics in the metrics database 350.

The cloud provisioning system 150 may also execute a benchmark test on select resources of the public cloud infrastructure 110 to determine the performance metrics of these resources. The cloud provisioning system 150 receives 606 the performance metrics from the public cloud infrastructure 110 and stores the performance metrics in the metrics database 350.

The performance calculator 340 (refer to FIG. 3) of the cloud provisioning system 150 computes 610 the performance ratio based on the performance metrics of the public cloud infrastructure 110 and the performance metrics of the private infrastructure 160. The performance ratio allows the provision handler 320 to estimate the runtime for executing an EDA task on the public cloud infrastructure 110 relative to the runtime for executing the same EDA task on the private infrastructure 160. The computed performance ratio is stored in the metrics database 350.

Figure 7:
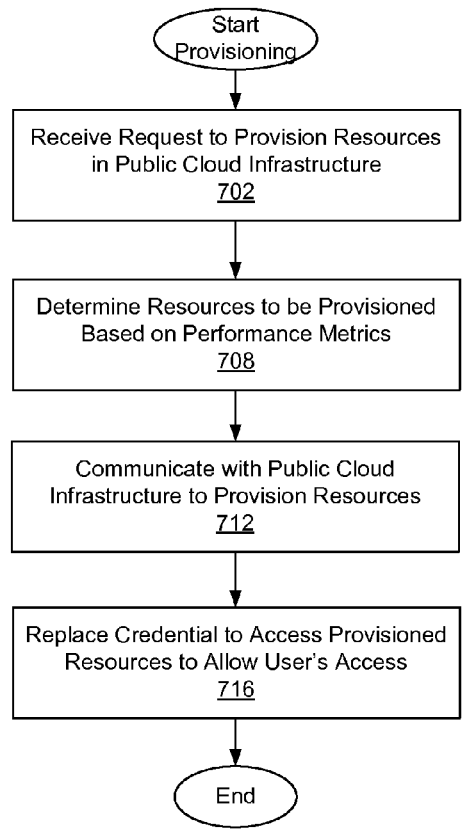
FIG. 7 is a flowchart illustrating a process of provisioning components in public cloud infrastructure, according to one embodiment.

FIG. 7 is a flowchart illustrating the process of provisioning resources in the public cloud infrastructure 110, according to one embodiment. In one embodiment, a user divides EDA tasks for performing on the public cloud infrastructure 110 and the private infrastructure 160 based on one or more criteria. The criteria may include, but are not limited to, the total budget for an EDA task set, the maximum runtime of the EDA task set, and security risk associated with each EDA task. The user may allocate the EDA tasks with the help of a task allocation program executed on the cloud provisioning system 150 and/or the user client device 170. In another embodiment, assignment of each EDA task to the public cloud infrastructure 110 or the private infrastructure 160 is determined automatically at the provision handler 320 of the cloud provisioning system 150.

After the EDA tasks are assigned to the public cloud infrastructure 110 or the private infrastructure 160, the cloud provisioning system 150 receives 702 a request to provision resources in the public cloud infrastructure 110. The request may include description about EDA tasks to be performed on the public cloud infrastructure 110 and constraint conditions associated with the EDA tasks. Typical constraint conditions may include, for example, the maximum runtime of the EDA tasks, the maximum number of workers 120 provisioned, the maximum number or types of EDA tools to be loaded (subject to the number of purchased EDA licenses) and the maximum cost for provisioning the resources in the public cloud infrastructure 110.

The provision handler 320 determines 708 the configuration of resources to be provisioned based on the performance metrics stored in the metrics database, as described below in detail with reference to FIG. 8. The performance metrics may include, among others, the performance ratio and the past or statistical performance information.

After the provision handler 320 determines the configuration of resources to be provisioned, the provision handler 320 communicates with the public cloud infrastructure 110 to provision the resources. The provisioning operations may include, among other operations, (i) selecting servers or storage devices for provisioning, (ii) loading of software components to the servers, and (iii) establishing communication channels between the resources.

After provisioning the resources, the provision handler 320 replaces its credential with the user's credential to allow the user to access the provisioned resources. In one embodiment, the provision handler 320 retrieves the user's public key from the user database 310 and replaces the key used by the cloud provisioning system 150 with the user's public key.

Figure 8:
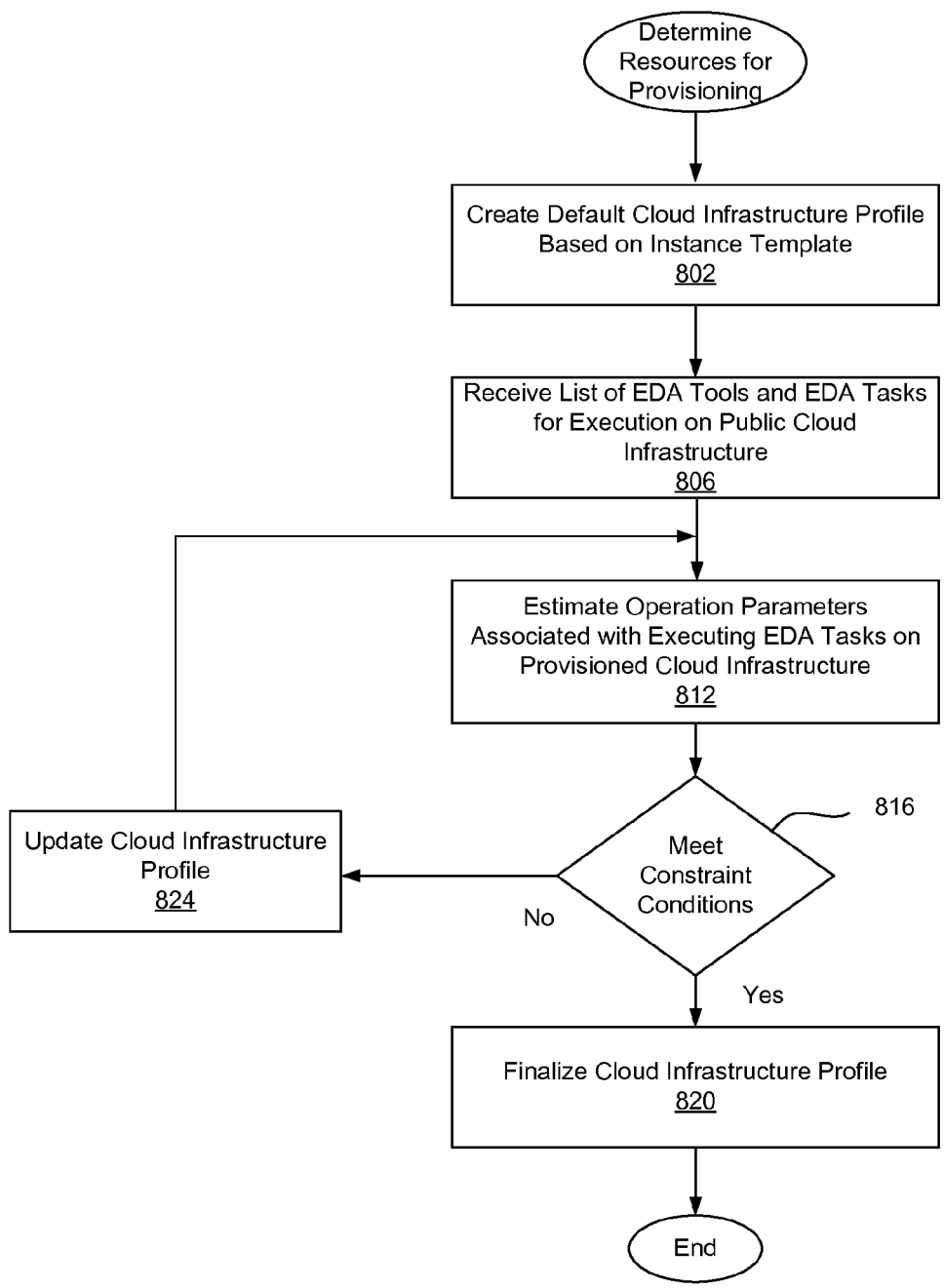
FIG. 8 is a flowchart illustrating a process of determining resources to be provisioned in the public cloud infrastructure, according to one embodiment.

FIG. 8 is a flowchart illustrating the process of determining resources for provisioning in the public cloud infrastructure 110, according to one embodiment. The provision handler 320 retrieves the instant template for the corresponding user from the user database 310 and creates 802 a default cloud infrastructure profile for resources to be provisioned in the public cloud infrastructure 110. Then the provision handler 320 receives 806 a list of EDA tools and EDA tasks for execution on public cloud infrastructure 110.

The provision handler 320 then estimates 812 operation parameters associated with executing EDA tasks on the provisioned resources as described in the cloud infrastructure profile. The operation parameters may include, for example, the number of EDA tool licenses, the overall runtime of the EDA tasks, the number of workers, and the cost associated with performing the EDA tasks. The provision handler 320 may take into account information such as the performance ratio and past or statistical information of the public cloud infrastructure 110 to estimate the operation parameters.

Then the provision handler 320 determines if the estimated operation parameters meets 816 the constraint conditions. If the constraint conditions are satisfied, then the cloud infrastructure profile is finalized 820.

Conversely, if at least one constraint condition is not satisfied, provision handler 320 updates 824 the cloud infrastructure profile. The updating of the cloud infrastructure profile may involve various changes in the cloud infrastructure profile. For example, if the cloud infrastructure profile fails to satisfy the maximum runtime, the cloud infrastructure profile is updated to include additional workers or replace lower performance workers with higher performance workers to shorten the overall runtime. If the maximum cost for provisioning the resources is exceeded or the maximum number of licenses is exceeded, then the cloud infrastructure profile is updated to reduce the number of workers or modify the EDA task plan to stagger execution of the EDA tools on the workers. The process then returns to estimating 812 the operation parameters and repeats the subsequent processes. The profile handler 320 attempts to provision less expensive resource, if possible.

In one embodiment, the provision handler 320 selects a cloud infrastructure profile that minimizes the overall cost from multiple candidate cloud infrastructure profiles that satisfy the constraint conditions. Further, the provision handler 320 may alert the user if there is no cloud infrastructure profile that satisfies all of the constraint conditions. Various optimization algorithms may be employed to determine the preferred cloud infrastructure profile.

Figure 9:
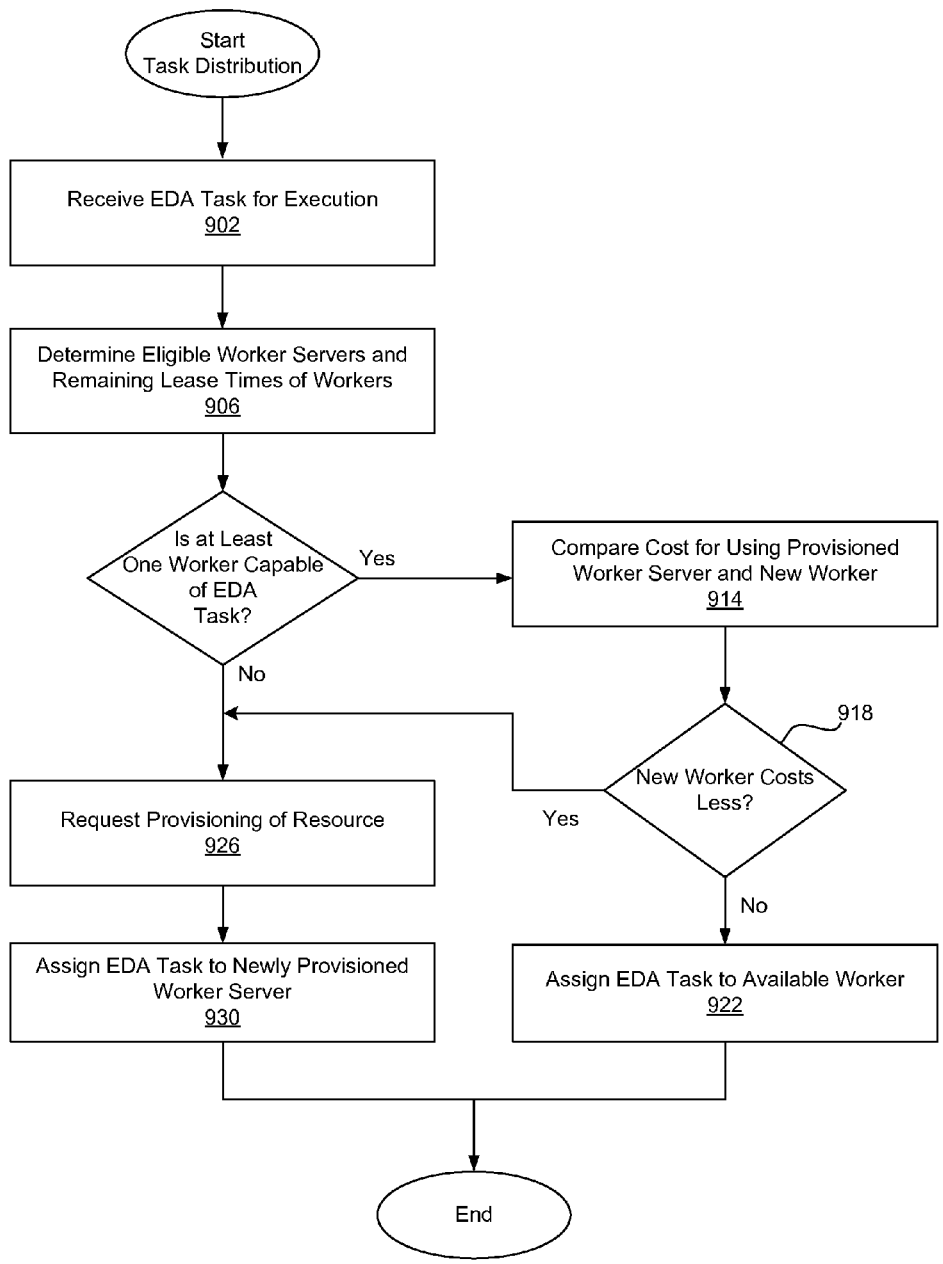
FIG. 9 is a flowchart illustrating a process of distributing a task, according to one embodiment.

FIG. 9 is a flowchart illustrating the process of distributing a task to workers 120, according to one embodiment. The task distributor 220 (refer to FIG. 2) receives 902 an EDA task for execution on the public cloud infrastructure 110. The task distributor 220 then determines 906 provisioned workers 120 capable of performing the received EDA task and the leased time remaining on the provisioned workers 120. Due to different hardware configurations and loaded software components, some EDA tasks may not be performed on low performance workers 120. Therefore, each worker may be capable of performing one set of EDA tasks but not others.

If it is determined that there is at least one provisioned worker available to perform the EDA task, the task distributor 220 compares 914 the cost for using the already provisioned worker and the cost for provisioning a new worker. If the already provisioned worker is an expensive resource and performing the EDA task on the already provisioned worker is likely to require extending of the leased time, it may cost less to provision a new and less expensive worker to replace the expensive worker. Conversely, if the EDA task can be performed on the already provisioned worker within the current leased unit of time, then it may cost less to perform the EDA task on the already provisioned worker because performing the EDA task on already provisioned worker does not require any additional fees. When provisioning a new worker, the time and cost needed for loading EDA tools is taken into account.

If it is determined 918 that the cost of provisioning a new worker is not less than using the already provisioned worker, the task distributor 220 allocates 922 the EDA task to the already provisioned worker. The EDA task may be added to the task queue for the already provisioned worker, and then executed on the worker when any slots in the worker become available.

Conversely, if it is determined 918 that provisioning a new server 918 and decommissioning the already provisioned worker is more cost efficient, the task distributor 220 sends a request 926 to the cloud provisioning system 150 to provision the new worker. The cloud provisioning system 150 then provisions the new worker. After provisioning the new worker, the task distributor 220 assigns 930 the EDA task to the newly provisioned worker.

In one embodiment, the task distributor 220 monitors the status of EDA tasks in the workers 120 and dynamically assigns the EDA tasks according to the status of the workers 120. Already provisioned servers may be decommissioned while provisioning new servers to perform the EDA tasks in a more cost-efficient manner.

The foregoing description of the embodiments has been presented for the purposes of illustration and description. It is not intended to be exhaustive or to limit to the precise form disclosed. Many modifications and variations are possible in light of the above teaching.

What is claimed is:

1. A method of provisioning computing resources for performing a plurality of EDA tasks, comprising:
    receiving a request to provision computing resources in a public computing infrastructure to perform the EDA tasks, the public computing infrastructure including a plurality of computing resources selectable for provisioning;
    receiving performance metrics of the computing resources, the performance metrics comprise a performance ratio and past or statistical performance information, the performance ratio representing performance characteristics of a computing resource in the public computing infrastructure relative to a reference computing device, and the past or statistical performance information representing performance characteristics of the computing resource in previous EDA tasks; and
    determining a profile representing a set of computing resources to be provisioned in the public computing infrastructure based on the performance metrics, the profile defining types and a number of computing resources to be provisioned, each type of computing resource associated with a different set of capable EDA tasks and a performance metric.

2. The method of claim 1, wherein the plurality of EDA tasks are partially allocated to private computing infrastructure and partially allocated to the computing resources in the public computing infrastructure, and wherein the reference computing device corresponds to the private computing infrastructure.

3. The method of claim 1, determining the profile comprises:
    (a) generating an initial profile of computing resources for provisioning according to a default template;
    (b) estimating operation parameters associated with the initial profile of computing resources;
    (c) determining if estimated operation parameters corresponding to the initial profile satisfy one or more constraint conditions;
    (d) updating the initial profile responsive to determining that the estimated operation parameters fail to satisfy at least one of the constraint conditions;
    (e) estimating operation parameters associated with the updated profile of computing resources; and
    (f) repeating (d) and (e) responsive to determining that the estimated operation parameters of the updated profile fail to satisfy at least one of the constraint conditions.

4. The method of claim 3, wherein the constraint conditions comprise a maximum total runtime for performing the EDA tasks.

5. The method of claim 3, wherein the constraint conditions comprise a maximum total cost for executing the EDA tasks.

6. The method of claim 1, further comprising receiving a request to provision a computing resource after initiating at least one EDA task responsive to determining that provisioning of a new computing resource to execute a pending EDA task is less expensive compared to executing the pending EDA task on a provisioned computing resource.

7. The method of claim 6, further comprising:
    determining a remaining lease time available on the provisioned computing resource;
    determining whether the pending EDA task can be accomplished within the remaining lease time of the provisioned computing resource; and
    receiving the request to provision the additional computing resource responsive to determining that the pending EDA task cannot be accomplished within the remaining lease time and determining that less expensive computing resource capable of performing the pending EDA task is available for provisioning.

8. The method of claim 1, further comprising replacing a first credential for accessing the provisioned computing resources with a second credential to enable a user to access the provisioned computing resources.

9. The method of claim 1, wherein the provisioned computing resources comprise a gateway server, one or more workers and a license server, the gateway server configured to communicate with a user client server accessed by a user and distribute the EDA tasks to the workers, and the license server configured to manage types and number of EDA tools deployed in the provisioned computing resources.

10. A computing resource provisioning system for provisioning computing resources to perform an electronic design automation (EDA) tasks, comprising:
    a communication module configured to:
        receive a request to provision computing resources in a public computing infrastructure to perform the EDA tasks, the public computing infrastructure including a plurality of computing resources that can be selected for provisioning, and
        receive performance metrics of the computing resources, the performance metrics comprise a performance ratio and past or statistical performance information, the performance ratio representing performance characteristics of a computing resource in the public computing infrastructure relative to a reference computing device, and the past or statistical performance information representing operating performance characteristics of the computing resource in previous EDA tasks; and
    a provision handler configured to determine a profile representing a set of computing resources to be provisioned in the public computing infrastructure based on the performance metrics, the profile defining types and a number of computing resources to be provisioned, each type of computing resource associated with a different set of eligible EDA tasks and a performance metric.

11. The computing resource provisioning system of claim 10, wherein the provision handler is further configured to:
   (a) generate an initial profile of computing resources for provisioning according to a default template;
   (b) estimate operation parameters associated with the initial profile of computing resources;
   (c) determine if estimated operation parameters corresponding to the initial profile satisfy one or more constraint conditions;
   (d) update the initial profile responsive to determining that the estimated operation parameters fail to satisfy at least one of the constraint conditions;
   (e) estimate operation parameters associated with the updated profile of computing resources; and
   (f) repeat (d) and (e) responsive to determining that the estimated operation parameters of the updated profile fail to satisfy at least one of the constraint conditions.

12. The computing resource provisioning system of claim 11, wherein the provisioned computing resources comprise a gateway server, one or more workers and a license server, the gateway server configured to communicate with a user client server accessed by a user and distribute the EDA tasks to the workers, and the license server configured to manage types and number of EDA tools deployed in the provisioned computing resources.

13. The computing resource provisioning system of claim 10, wherein the constraint conditions comprise at least one of a maximum total runtime for performing the EDA tasks and a maximum estimated total cost for executing the EDA tasks.

14. The computing resource provisioning system of claim 10, wherein the communication module is further configured to receive a request to provision a computing resource after initiating at least one EDA task responsive to determining that provisioning of a new computing resource to execute an EDA task is less expensive compared to executing the EDA task in a provisioned computing resource.

15. The computing resource provisioning system of claim 10, wherein the provision handler is further configured to replace a first credential for accessing the provisioned computing resources with a second credential to allow a user to access the provisioned computing resources.

16. A management server in a public computing infrastructure for distributing electronic design automation (EDA) tasks to a plurality of workers, comprising:
   a communication module configured to receive an EDA task; and
   a task distributor configured to:
      determine a remaining lease time available on a first worker, the first worker previously provisioned and capable of performing the EDA task;
      assigning the EDA task to the first worker responsive to determining that a cost for executing the EDA task on the first worker is not higher than provisioning a second worker and performing the EDA task on the second worker; and
      requesting provisioning of the second worker responsive to determining that a cost of provisioning the second worker and performing the EDA task on the second worker is lower than performing the EDA task on the first worker.

17. The management server of claim 16, further comprising a performance manager for collecting information on performance characteristics of the plurality of the workers after the EDA tasks are finished, and sending the collected information to a computing resource provisioning system.

18. The management server of claim 16, wherein the task distributor is further configured to:
   determine a remaining lease time available on the first worker;
   determine whether the EDA task can be accomplished within the remaining lease time of the first worker; and
   assign the EDA task to the first worker responsive to determining that the EDA task can be accomplished within the remaining lease time of the first worker.

* * * * *